(12) United States Patent
Chen et al.

(10) Patent No.: US 8,582,734 B2
(45) Date of Patent: Nov. 12, 2013

(54) ACCOUNT ADMINISTRATION SYSTEM AND METHOD WITH SECURITY FUNCTION

(75) Inventors: Gigi Chen, Taipei (TW); Ko Li Chao, Taipei (TW); Chuen-Tai Wu, Taipei (TW)

(73) Assignees: Shooter Digital Co., Ltd., Taipei (TW); Gigi Chen, Taipei (TW)

( * ) Notice: Subject to any disclaimer, the term of this patent is extended or adjusted under 35 U.S.C. 154(b) by 1608 days.

(21) Appl. No.: 11/723,423

(22) Filed: Mar. 20, 2007

(65) Prior Publication Data
US 2008/0232563 A1    Sep. 25, 2008

(51) Int. Cl.
*H04M 11/00* (2006.01)

(52) U.S. Cl.
USPC ........................................ 379/93.02; 455/411

(58) Field of Classification Search
USPC ............... 379/93.02, 93.03, 93.04, 93.12; 455/410, 411, 414.1; 726/4, 6, 7
See application file for complete search history.

(56) References Cited

U.S. PATENT DOCUMENTS

| 6,112,078 | A | * | 8/2000 | Sormunen et al. | 455/411 |
| 7,606,560 | B2 | * | 10/2009 | Labrou et al. | 455/411 |
| 8,213,583 | B2 | * | 7/2012 | Finogenov | 379/93.02 |
| 2003/0204726 | A1 | * | 10/2003 | Kefford et al. | 713/171 |
| 2004/0203595 | A1 | * | 10/2004 | Singhal | 455/411 |
| 2006/0094403 | A1 | * | 5/2006 | Norefors et al. | 455/411 |
| 2007/0043681 | A1 | * | 2/2007 | Morgan et al. | 705/67 |
| 2007/0077916 | A1 | * | 4/2007 | Saito | 455/411 |
| 2009/0328183 | A1 | * | 12/2009 | Frenkel et al. | 726/11 |

FOREIGN PATENT DOCUMENTS

| CN | 1832401 A | 9/2006 |
| KR | 1020050017648 A | 2/2005 |
| TW | 200605600 A | 2/2006 |
| TW | 200612291 A | 4/2006 |
| TW | 200644565 A | 12/2006 |

* cited by examiner

*Primary Examiner* — Stella Woo
(74) *Attorney, Agent, or Firm* — Rosenberg, Klein & Lee

(57) ABSTRACT

An account administration system and method with security function are provided. The system comprises an identification unit, an issue unit, a portable communication device, and a identification device, wherein after the issue unit receiving the request massage from the portable communication device, a user password will be generated from the issue unit, and the user password will be sent to the portable communication device and the identification unit, thus, user can input the user password to the identification device received from the portable communication device, furthermore, according to the user account used, the identification procedure of the identification unit will exam to be passed for the identification device, such that the online access with the identification unit will be achieved.

8 Claims, 8 Drawing Sheets

ACCOUNT ADMINISTRATION SYSTEM AND METHOD WITH SECURITY FUNCTION

FIELD OF THE INVENTION

The present invention relates to an account administration system and method with security function, having a user password issued from an issue unit for preventing the data loss.

BACKGROUND

In accordance with the development of society is progressing, various business transactions and administrations are going with. Usually, a user account or user password can be representative as a user identification for going through the desired business transactions and administrations due to the authority is qualified, for example, a person wants to operate the several controls and manage the administration authority who has to input his user account and user password according to the operation panel to go forward further operations.

The foregoing mentioned account administration system can be used in the fields of the military unit, the on-line game, the financial institution, and the so on, accordingly, user can login to administrate the system by inputting their user account and user password; for example, a user can input the user account and the user password to the automated teller machine (ATM) to go forward further business transactions since the authority is qualified. Of course, the player of on-line game can input the user account and the user password for playing the on-line game or storing value.

Referring to FIG. 1 is a prior art account administration system. The account administration system 10 comprises an identification device 111 and an identification unit 13 that comprises a storage device 131 for storing a plurality of user passwords 133 and a plurality of user accounts 14, wherein one of the user passwords 14 can be defined as an on-line user account 141. Generally, the on-line user account 141 and the user password 133 are predetermined by the user and stored in the storage device 131 of the identification unit 13; therefore, while a user wants to acquire the authority through the identification unit 13, the predetermined on-line user account 141 and the corresponding user password 133 are inputted from the identification device 111 and sent to the identification unit 13. Thereafter, the identification unit 13 is going to proceed to identify the on-line user account 141 and the user password 133. Accordingly, since the identification procedure is correct, the user can acquire the authority regarding to the on-line user account 141, such that the user can operate and administrate the system.

Due to the on-line user account 141 and the user password 133 are permanently stored in the identification unit 13, the hacker can invade the identification unit 13 for obtaining the on-line user account 141 and the user password 133, which will infringe the right for people. Practically, a usual identification unit 13 may request user to change the on-line user account 141 and the user password 133 regularly or irregularly for preventing the relevant data loss, however, the data security will be the problem still accordingly. Besides, changing the on-line user account 141 and user password 133 usually is a troublesome matter for most users.

SUMMARY OF THE INVENTION

It is a primary object of the present invention to provide an account administration system and method with security function that can prevent the invading from hackers, that is, a user can input a user password and an on-line user account generated from a different issue unit to the identification unit for further administrating the account administration system.

It is a secondary object of the present invention to provide an account administration method with security function, wherein the user password is generated by the issue unit, and the on-line user account is stored in the identification unit, thus, the hacker has to invade the issue unit and the identification unit at the same time for passing the identification procedure, such that the security of the account administration system can be improved.

It is another object of the present invention to provide an account administration method with security function, wherein after the issue unit receiving the request message from the portable communication device, a user password can be generated from the issue unit at real time, thus, hackers cannot obtain the user password, and even they invade the issue unit.

It is another object of the present invention to provide an account administration system with security function, wherein the user password will be failure, after finishing the identification procedure, thus, hackers cannot reuse the user password, which can exactly protect user's right.

It is another object of the present invention to provide an account administration system with security function, wherein the issue unit, the identification unit, the identification device, and the portable communication device comprise at least one codec that can code or decode the transmission data, and then the transmission data will not be disclosed, which can improve the security during sending procedure.

It is another object of the present invention to provide an account administration system with security function, wherein the portable communication device comprises a removing device that can remove the user password within a period of time to avoid the user password loss.

It is another object of the present invention to provide an account administration system with security function, wherein the user password generated by the issue unit will be failure after a time interval, which can improve the security.

To achieve the above mentioned objects, the present invention provides an account administration method with security function, comprising the steps of: sending a request message from a portable communication device to an issue unit; generating a user password by the issue unit, after receiving the request message; sending the user password to the portable communication device and an identification unit; inputting an on-line user account and the user password received by the portable communication device to an identification device; and communicating the identification device with the identification unit and further proceeding an identification procedure.

Further, the present invention further provides an account administration method with security function, comprising the steps of: generating a user password by an issue unit during a time interval; sending the user password to a portable communication device and an identification unit; inputting an on-line user account and the user password received by the portable communication device to an identification device; and communicating the identification device with the identification unit and further proceeding an identification procedure.

Further, the present invention further provides an account administration method with security function, comprising the steps of: generating a user password by a portable communication device; sending the user password to an identification unit; inputting an on-line user account and the user password generated by the portable communication device to an identification device; and communicating the identification device with the identification unit and proceeding an identification procedure.

Further, the present invention further provides an account administration system with security function, comprising: an identification unit used to proceed an identification procedure, comprising a storage device for storing a plurality of user accounts, and one of the user accounts can be defined as an on-line user account; an issue unit connected with the identification unit via a first transmission line, comprising a password generator for generating a user password related to the on-line user account after receiving a request message, and sending the user password to the identification unit via the first transmission line; and a client end connected with the identification unit via a second transmission line, comprising an identification device and a portable communication device, wherein the portable communication device is used to send the request message to the issue unit, the issue unit issues the user password to the portable communication device via the second transmission line, and then, the identification device communicates with the identification unit and proceeding the identification procedure in accordance with the user password and the on-line user account.

Further, the present invention further provides an account administration system with security function, comprising: an identification unit used to proceed an identification procedure, comprising a storage device for storing a plurality of user accounts, and one of the user accounts can be defined as an on-line user account; an issue unit connected with the identification unit via a first transmission line, comprising a password generator for generating a user password related to the on-line user account during a time interval, and sending the user password to the identification unit via the first transmission line; and a client end connected with the identification unit via a second transmission line, comprising an identification device and a portable communication device, wherein the issue unit sends the user password to the portable communication device via the second transmission line, and then, the identification device communicates with the identification unit and proceeds the identification procedure in accordance with the user password and the on-line user account.

Further, the present invention further provides an account administration system with security function, comprising: an identification unit used to proceed an identification procedure, comprising a storage device for storing a plurality of user accounts, and one of the user accounts can be defined as an on-line user account; and a client end connected with the identification unit, comprising an identification device and a portable communication device, wherein the portable communication device comprises a password generator for generating a user password related to the on-line user account and sends the user password to the identification device, and then, the identification device communicates with the identification unit and proceeds the identification procedure in accordance with the user password and the on-line user account.

DETAILED DESCRIPTION

Figure 1:
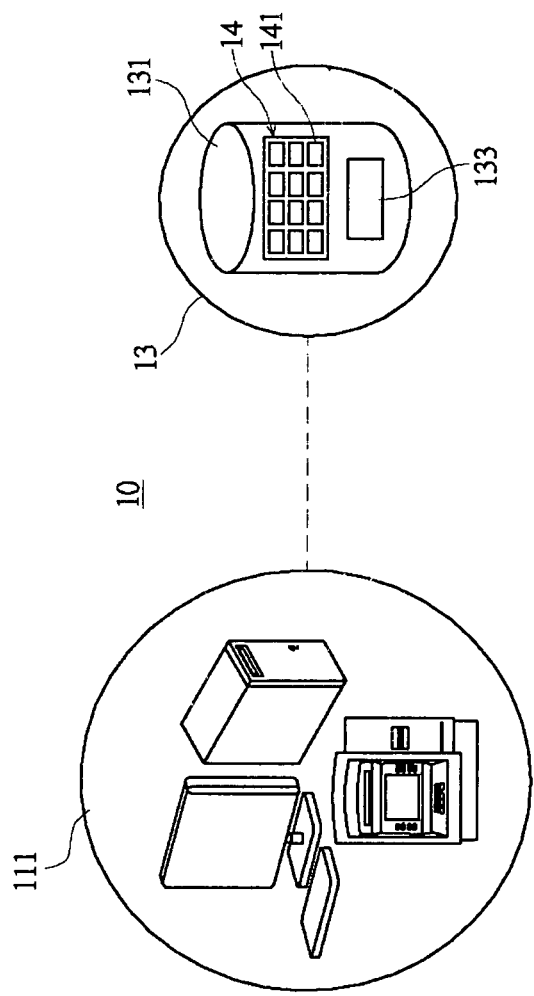
FIG. 1 is a schematic block diagram of a prior art account administration system.
Figure 2:
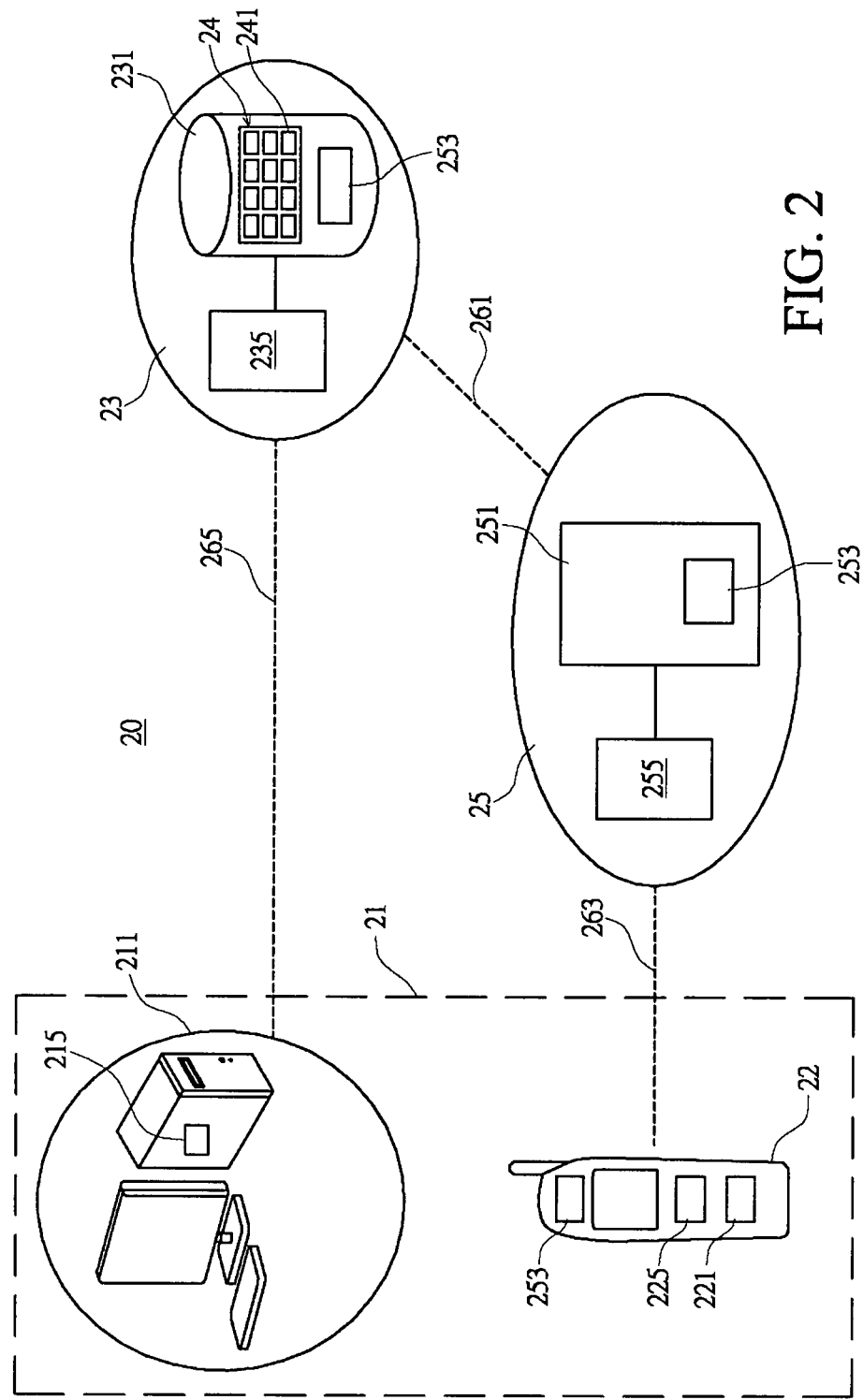
FIG. 2 is a schematic block diagram of a preferred embodiment of the present invention an account administration system with security function.
Figure 3:
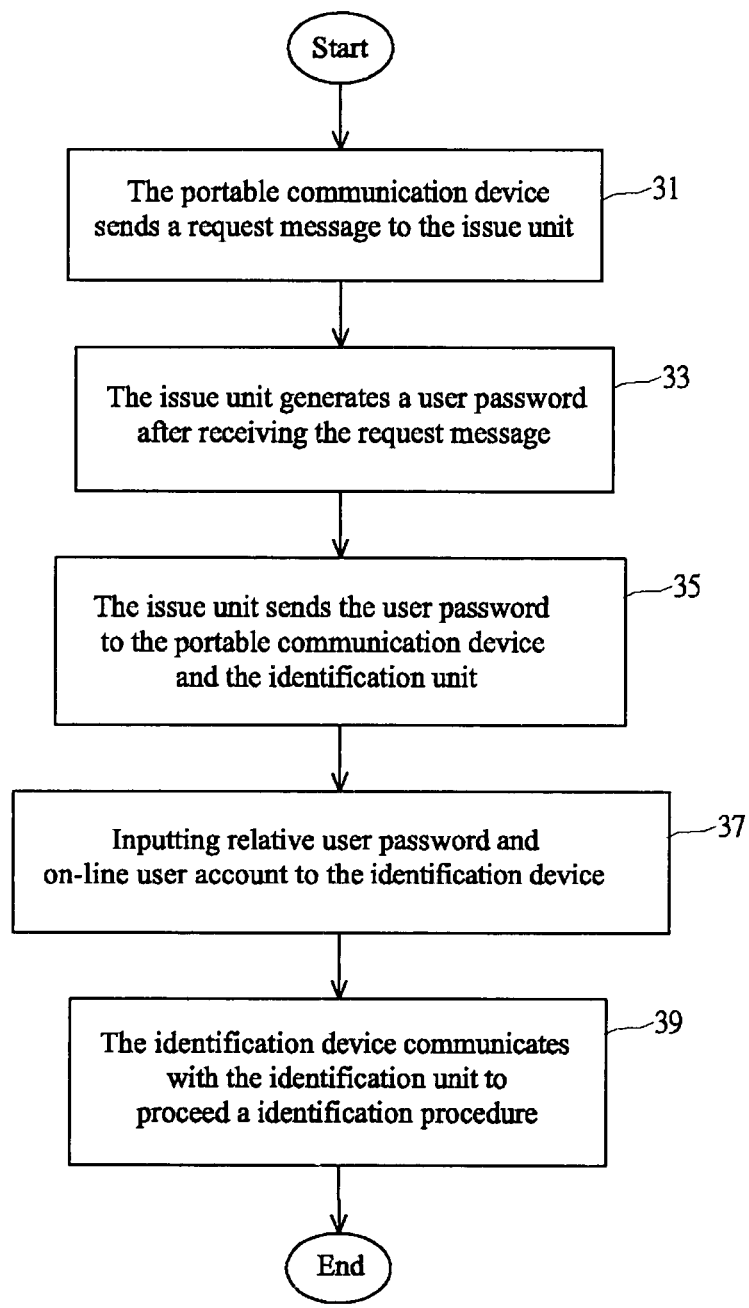
FIG. 3 is a flow chart of the preferred embodiment of the present invention an account administration method with security function.

Referring to FIG. 2 and FIG. 3 are respectively a schematic block diagram and a flow chart of an embodiment of the present invention. An account administration system 20 comprises an identification unit 23, an issue unit 25, and a client end 21 that comprises an identification device 211 and a portable communication device 22. The issue unit 25 connects with the identification unit 23 via a first transmission line 261, and connects with the portable communication device 23 via a second transmission line 263, accordingly, the issue unit 25 can send data to the portable communication device 22 and the identification unit 23, besides, the identification device 211 connects with the identification unit 23 via a third transmission line 265, wherein the first transmission line 261, the second transmission line 263, and the third transmission line 265 can be implemented by wired or wireless.

The identification unit 23 comprises a storage device 231 used to store a plurality of user accounts 24 and/or at least one user password 253 to proceed an identification procedure. The issue unit 25 comprises a password generator 251 for generating the user password 253, and further, the user password 253 has to be transmitted.

Referring to the FIG. 2 and FIG. 3, the account administration method of the invention is disclosed as following. After the issue unit 25 receiving a request message (not show) from the portable communication device 22, the user password 253 can be generated by the issue unit 25. For example, a user can operate the portable communication device 22 to generate a request message, and the request message can be sent to the issue unit 25 via the second transmission line 263, as shown on step 31. After the password generator 251 of issue unit 25 receiving the request message, the issue unit 25 can identify the request message to generate a user password 253 related to the request message, as shown on step 33.

As the password generator 251 generates the user password 253, the issue unit 25 can send the user password 253 to the portable communication device 22 via the second transmission line 263 and send the user password 253 to the identification unit 23 via the first transmission line 261, as shown on step 35. For example, if the portable communication device 22 is a cell phone, the issue unit 25 can identify the phone number or the number of the SIM card for sending the user password 253 related to the portable communication device 22.

After the identification unit 23 receiving the user password 253 related to an on-line user account 241, the user password 253 can be stored in the storage device 231 within the identification unit 23. For example, the storage device 231 is used to store a plurality of use accounts 24, and one of the use accounts 24 can be defined as an on-line user account 241 related to the user password 253, in another word, the user has to input the corresponding on-line user account 241 and the user password 253 for further going to control since the identification procedure has been passed by the identification unit 23.

As the portable communication device 22 receives and stores the user password 253, the user can know the user password 253 from the portable communication device 22; for example, the portable communication device 22 can be as a cell phone or a personal digital assistant (PDA), and the identification device 211 can be as an automated teller machine (ATM), a computer, a keyboard, an input device, and the so on. The user can input the user password 253 received by the portable communication device 22 and the on-line user account 241 related to the user password 253 to the identification device 211, as shown on step 37.

The identification device 21 communicates with the identification unit 23 via the third transmission line 265 and further proceeds an identification procedure. For example, the identification device 21 can send the user password 253 and the on-line user account 241 to the identification unit 23 via the third transmission line 265 that can be implemented by wired or wireless for proceeding the identification procedure. When the on-line user account 241 and the user password 253 from the identification device 211 have been received by the identification unit 23, the on-line user account 241 and user password 253 have to be compared with the on-line user account 241 and user password 253 stored in the storage device 231 to go forward the identification procedure, such as, whether the compared data are the same or not, as shown on step 39. Accordingly, the user can pass the identification procedure of the identification unit 23 in accordance with the user password 253 received from the portable communication device 22 and the on-line user account 241 memorized by the user.

The user has to input the user password 253 and the corresponding on-line user account 241 to the identification unit 23 for passing the identification procedure; for example, the on-line user account 241 is related to the user password 253. In the embodiment of the invention, the on-line user account 241 and the user password 253 don't be stored on the same device permanently, therefore, the hacker has to invade the identification unit 23 and the portable communication device 23 for getting the on-line user account 241 and the user password 253 to pass the identification procedure of the identification unit 23.

In addition, the password generator 251 of the issue unit 25 can generate the user password 253, after receiving the request message from the portable communication device 22, in another word, the identification unit 23, the issue unit 25, the identification device 211 and the portable communication device 22 don't store the user password 253 permanently. After receiving the request message from the portable communication device 22, the issue unit 25 can issue a user password 253 to the portable communication device 22, that is, the user password 253 is generated and sent from the password generator 251; therefore, the hacker cannot get the user password 253 by invading the issue unit 25.

Preferably, the user password 253 that is the one-time user password will be failure after finishing the identification procedure. Practically, the user password 253 is generated after receiving the request message from the portable communication device 22, and further, the user password 253 will be failure when the user has inputted the on-line user account 241 and the corresponding user password into the identification unit 211 and gone further passing the identification procedure. Accordingly, even hackers get the user password 253 and on-line user account 241 during the sending procedure; they can't pass the identification procedure still. Besides, the identification unit 23 only allows one alike on-line user account 241 and user password 253 to login during the identification procedure, such that the security of the account administration system 20 can be improved.

Above account administration system 20 can be used in various systems that can be entered by inputting the user account 24. For example, a plurality of user accounts 24 is stored in the identification unit 23, such as a sever, and the user can login to play the game or store value by inputting an on-line user account 241 that is one of the user accounts 24. Besides, the user has to operate the portable communication device 22, such as a cell phone, to send a request message to the issue unit 25, such that the password generator 251 of issue unit 25 can generate a user password 253 related to the on-line user account 241, and send the user password 253 to the portable communication device 22 and the identification unit 23. After receiving the user password 253, the user can input the user password 253 and the on-line user account 241 to the identification device 211, such as a computer, to communicate with the issue unit 23 and proceed the identification procedure.

In another embodiment of the invention, the account administration system 20 can be used in a finance house. A plurality of user accounts 24 is stored in the identification unit 23 of the finance house, such as a server. Therefore, when a user would like to proceed business transaction and administration in accordance with one of the user accounts 24, the user can communicate to the issue unit 25 and request a user password from the user password generator 251 through the portable communication device 22, such as a cellular phone. Consequently, the password generator 251 will generate a user password 253 related to the on-line user account 241, and send the user password 253 to the portable communication device 22 and the identification unit 23. As the user knows the user password 253, can input the user password 253 and the on-line user account 241 to the identification device 211, such as an automated teller machine (ATM) or a computer, to communicate with the issue unit 23 and proceed the identification procedure.

Of course, the foregoing mentioned account administration system 20 can be used in the fields of military unit, or other systems that need to distribute the authorities in according with the on-line user account 241 and the user password 253.

The issue unit 25, the identification unit 23, the portable communication device 22 and/or the identification device 211 can comprise a codec for coding the user password 253 before sending; for example, the issue unit 25 comprises a codec 255, the identification unit 23 comprises a codec 235, the identification device 211 comprises a codec 215, and the portable communication device 22 comprises a codec 225 for coding the sent data and decoding the received data for protecting the sent data during the sending procedure.

The portable communication device 22 comprises a removing device 221 for removing the user password 253 received from the issue unit 25 within a period of time. Furthermore, after sending the user password 253 to the portable communication device 22, the issue unit 25 can remove the user password 253 generated by the password generator 251. Of course, the identification unit 23 and the identification device 211 can remove the user password 235 and/or the on-line user account 241 within a period of time. For example, the portable communication device 22 and/or the issue unit 25 can remove the user password 253 thereof within a period of time, or the identification device 211 and/or storage device 231 can remove the user password 233 after finishing the identification procedure.

In addition, the user password 253 generated from the password generator 251 will be failure after a time interval to improve the security of the account administration system 20. Besides, the user password 253 can be as letters, numbers, signs, sounds, images, and combination thereof, and the user can input the on-line user account 241 and the corresponding user password 253 to pass the identification procedure of the identification unit 23.

The password generator 251 and the removing device 221 in above embodiment can be as hardware or software; for example, the removing device 221 of the portable communication device 22 can be edited by JAVA. Practically, there are different pluralities of portable communication devices 22 to request issue unit 25 for generating the user passwords 253 at the same time; thus, the issue unit 25 has to generate and send different pluralities of user passwords 253. The storage device 231 of identification unit 23 can store pluralities of on-line user accounts 241 and corresponding user passwords 253, and proceed the identification procedure of pluralities of user passwords 253 and on-line user accounts 241 at the same time.

Figure 4:
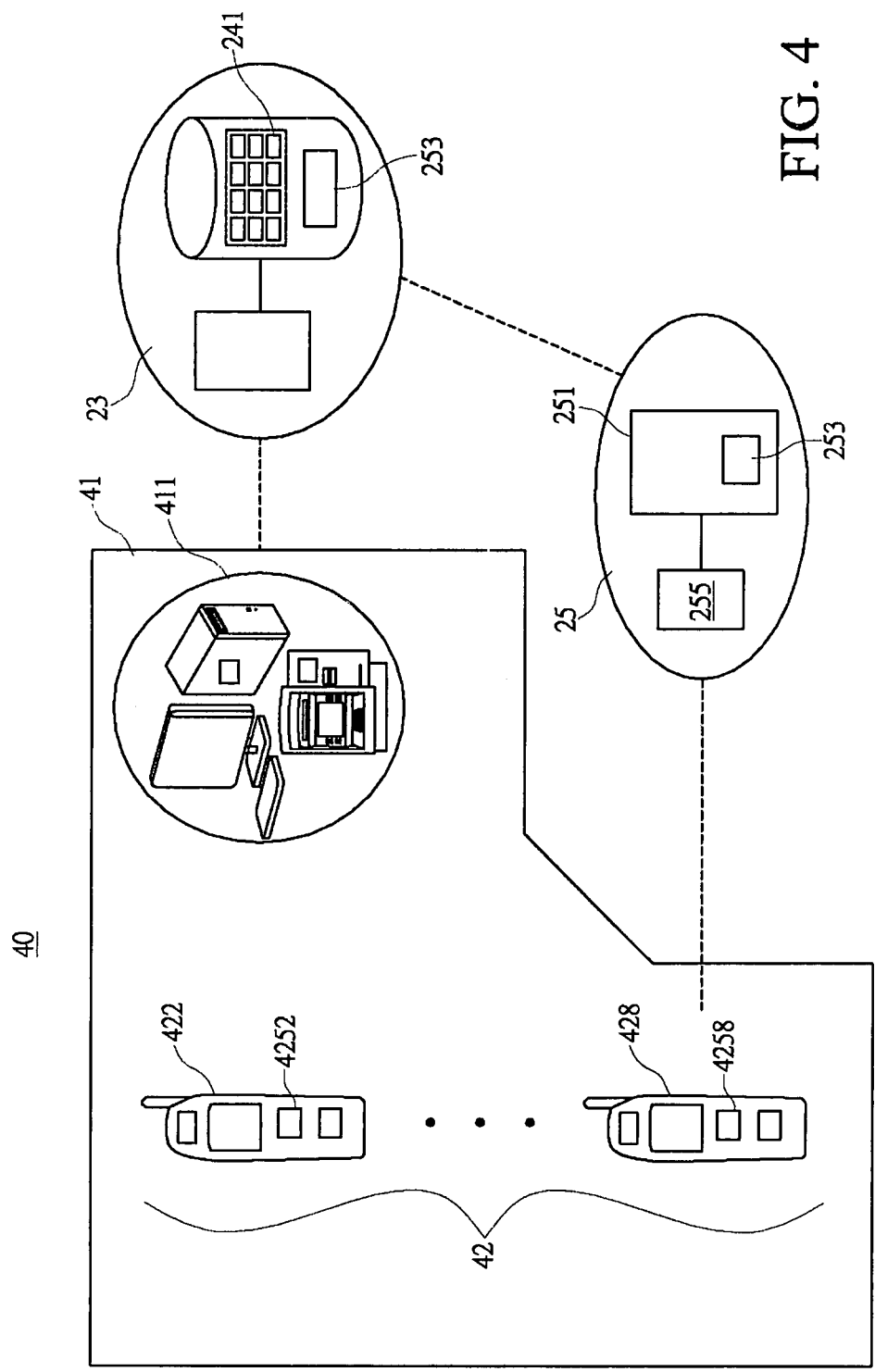
FIG. 4 is a schematic block diagram of another embodiment of the present invention an account administration system with security function.
Figure 5:
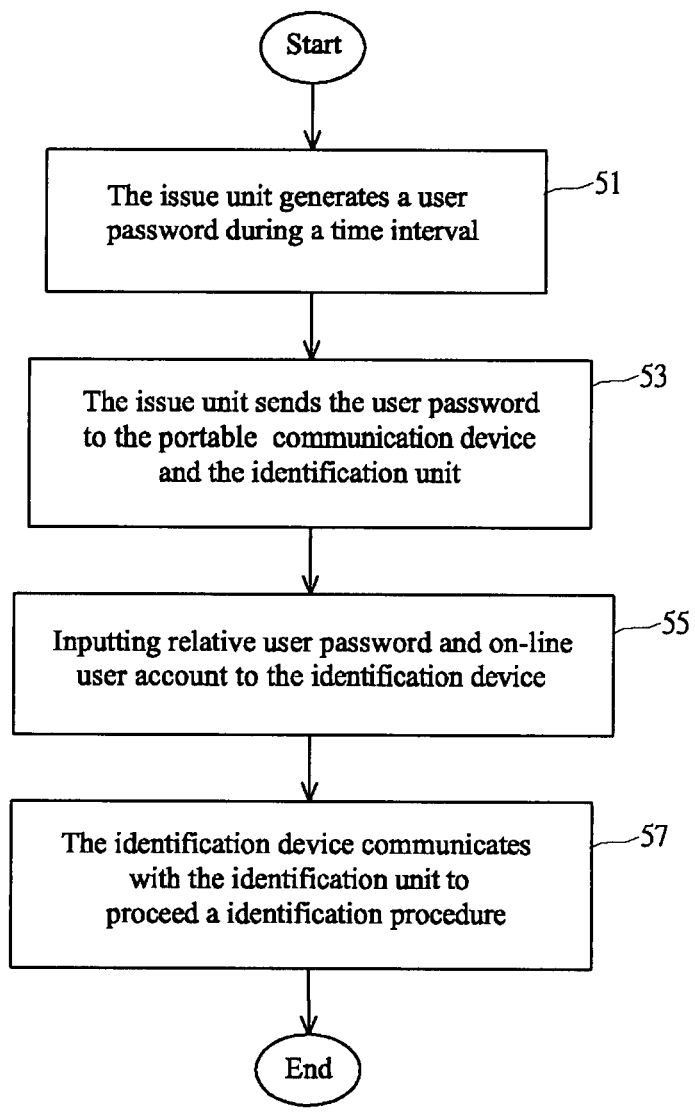
FIG. 5 is a flow chart of another embodiment of the present invention an account administration method with security function.

Referring to FIG. 4 and FIG. 5 are respectively a schematic block diagram and a flow chart of another embodiment of the present invention. The account administration system 40 comprises an identification unit 23, an issue unit 25 and a client end 41 for proceeding the identification procedure of the on-line user account 241 and the user password 253.

The issue unit 25 comprises a password generator 251 for generating the user password 253 during a time interval, as shown on step 51. After generating the user password 253, the issue unit 25 can send the user password 253 to the identification unit 23 and the portable communication device 42 of client end 41, as shown on step 53. For example, the password generator 251 of the issue unit 25 can generate a new user password 253 every 24 hours, and the issue unit 25 can send the user password 253 to the portable communication device 42 and the identification unit 23.

After the portable communication device 42 receiving the user password 253, the user can input the on-line user account 241 and the corresponding user password 253 to the identification device 411, as shown on step 55. The identification device 411 can communicate with the identification unit 23 and send the on-line user account 241 and the user password 253 to the identification unit 23, such that the identification unit 23 can proceed the identification procedure, as shown on step 57.

Practically, the issue unit 25 has to send the user passwords 253 to corresponding portable communication devices 42, such as the first portable communication device 422, . . . , and nth portable communication device 428. Each portable communication device 42 has a unique code; for example, as the portable communication device 422/ . . . /428 are the cell phone, the number of cell phone or the SIM card can be the unique code, and then the issue unit 25 can send the user password 253 to corresponding portable communication device 42 according to the unique code.

Thereafter, each codec 4252/ . . . /4258 of portable communication device 422/ . . . /428 is different, and that is related to the codec 255 of the issue unit 25 for cording or decoding. For example, the user who has joined the account administration system 30 can get a personal first codec 4252 installed in the first portable communication device 422.

The codec 255 of the issue unit 25 can code the user password 253 with different coding according to the corresponding receivers; therefore, the coded user password 253 can be sent to the corresponding portable communication device 422/ . . . /428. For example, the codec 255 of the issue unit 25 codes the user password 253, and sends the coded user password 253 to the first portable communication device 422. The first codec 4252 of the first portable communication device 422 can decode the coded user password 253, after receiving the user password 253. Further, since the user password 253 has been coded, the opportunity of losing user password 253 will be reduced, even if hackers get the user password 253, or the issue unit 25 makes a mistake during the sending procedure, surely, the security of data transmission can be improved. Of course, the codec 4252/ . . . /4258 of the portable communication device 422/ . . . . /428 can be hardware or software; for example, the codec 4252/ . . . /4258 are edited by JAVA.

Figure 6:
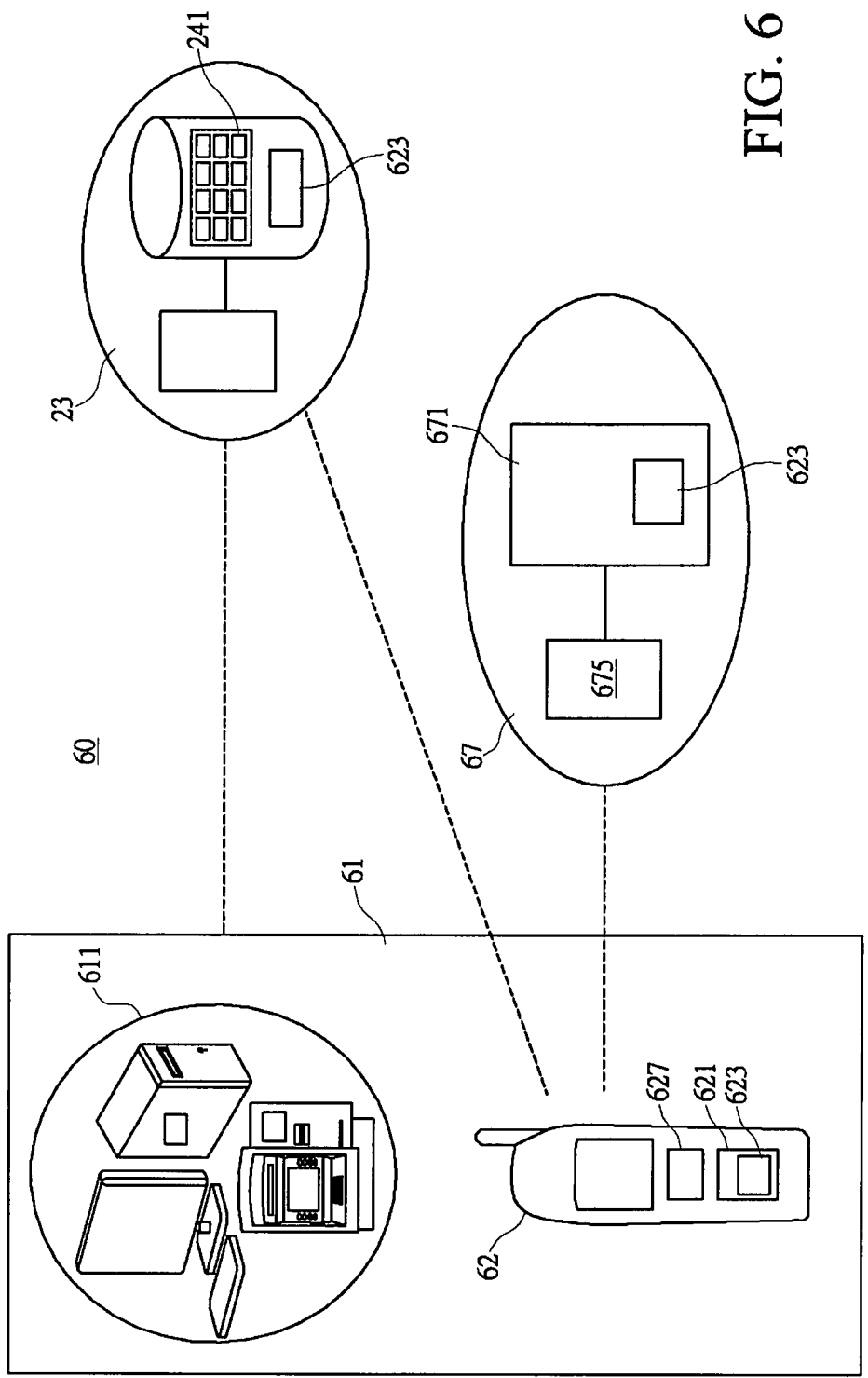
FIG. 6 is a schematic block diagram of another embodiment of the present invention an account administration system with security function.
Figure 7:
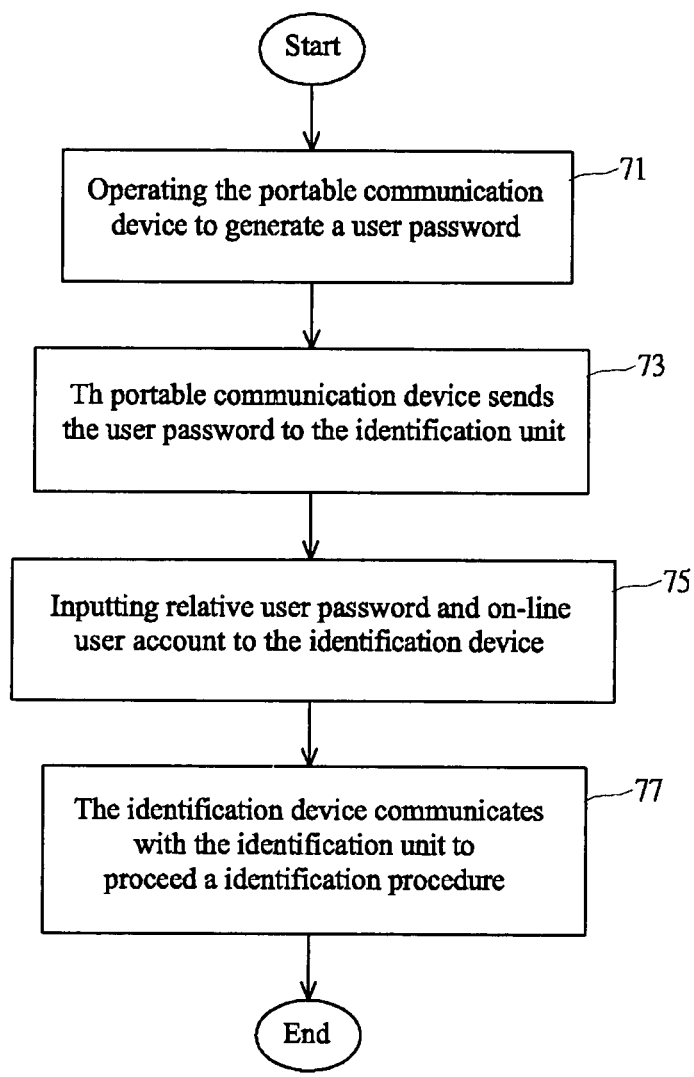
FIG. 7 is a flow chart of another embodiment of the present invention an account administration method with security function.

Referring to FIG. 6 and FIG. 7 are respectively a schematic block diagram and flow chart of another embodiment of the present invention. The account administration system 60 comprises an issue unit 23 and a client end 61, wherein the client end 61 comprises an identification device 611 and a portable communication device 62 that can generate a user password 623 for proceeding the identification procedure.

The user can operate the portable communication device 62 to login the account administration system 60; for example, the user can operate the portable communication device 62, and the password generator 621 of the portable communication device 62 can generate the user password 623, as shown on step 71. Of course, the user can determine the user password 623 by himself. Preferably, the user has to input a secret code to the portable communication device 62, accordingly, the password generator 621 can generate the user password 623 in another embodiment of the invention.

After generating the user password 623, the portable communication device 62 can send the user password 623 to the identification unit 23 for proceeding the identification procedure, as shown on step 73. The structure and function of the identification unit 23 and client end 61 disclosed in this embodiment of the present invention are similar with the FIG. 2, only that, the portable communication device 62 comprises a password generator 621 for generating the user password 623 related to an on-line user account 241. Besides, the portable communication device 62 can send the code thereof with the user password 623 to the identification unit 23, and the identification unit 23 can identify the portable communication device 62 by the code for confirming the user password 623.

Of course, a codec 625 can be set within the portable communication device 62, and a codec 235 related to the codec 625 can be set within the identification unit 23 for coding or decoding the data, such as user password 623, that is sent between the portable communication device 62 and the identification unit 23. Furthermore, the identification unit 23 can identify the portable communication device 62 by the coding mode of the codec 235/625; for example, the coding mode of the user password 623 is varied with portable communication device 62, so the identification unit 23 can identify the portable communication device 62 by the coding mode.

As the portable communication device 62 generates the user password 623, the user can input the user password 623 and the on-line user account 241 memorized by user to the identification device 611, as shown on step 75. The identification device communicates with the identification unit to proceed the identification procedure. For example, the identification device 611 sends the user password 623 and the corresponding on-line user account 241 to the identification unit 23, and the identification unit 23 can receive that to proceed the identification procedure, as shown on step 77. Preferably, a removing device 627 can be set within the portable communication device 62 to remove the user password 623 generated by the password generator 621, after the portable communication device 62 sending the user password 623 to the identification unit 23.

The user has to input the user password 623 and the corresponding on-line user account 241 to pass the identification procedure of the identification unit 23 in a moment. Even hacker invades the identification unit 23 and the portable communication device 62 at the same time; they cannot get the user password 623 and the on-line user account 241. Furthermore, the user password 623 is the one-time password and coded during the sending procedure, so the security of account administration system 60 can be improved.

The account administration system 60 in the embodiment of the invention further comprises a monitor unit 67 for receiving the user password 623 generated by the portable communication device 62, wherein the monitor unit 67 comprises a storage device 671 to store the on-line user account 241 and/or the corresponding user password 623 that can be used for further checking. In addition, the monitor unit 67 can comprise a codec 675 to code or decode the user password 623.

Figure 8:
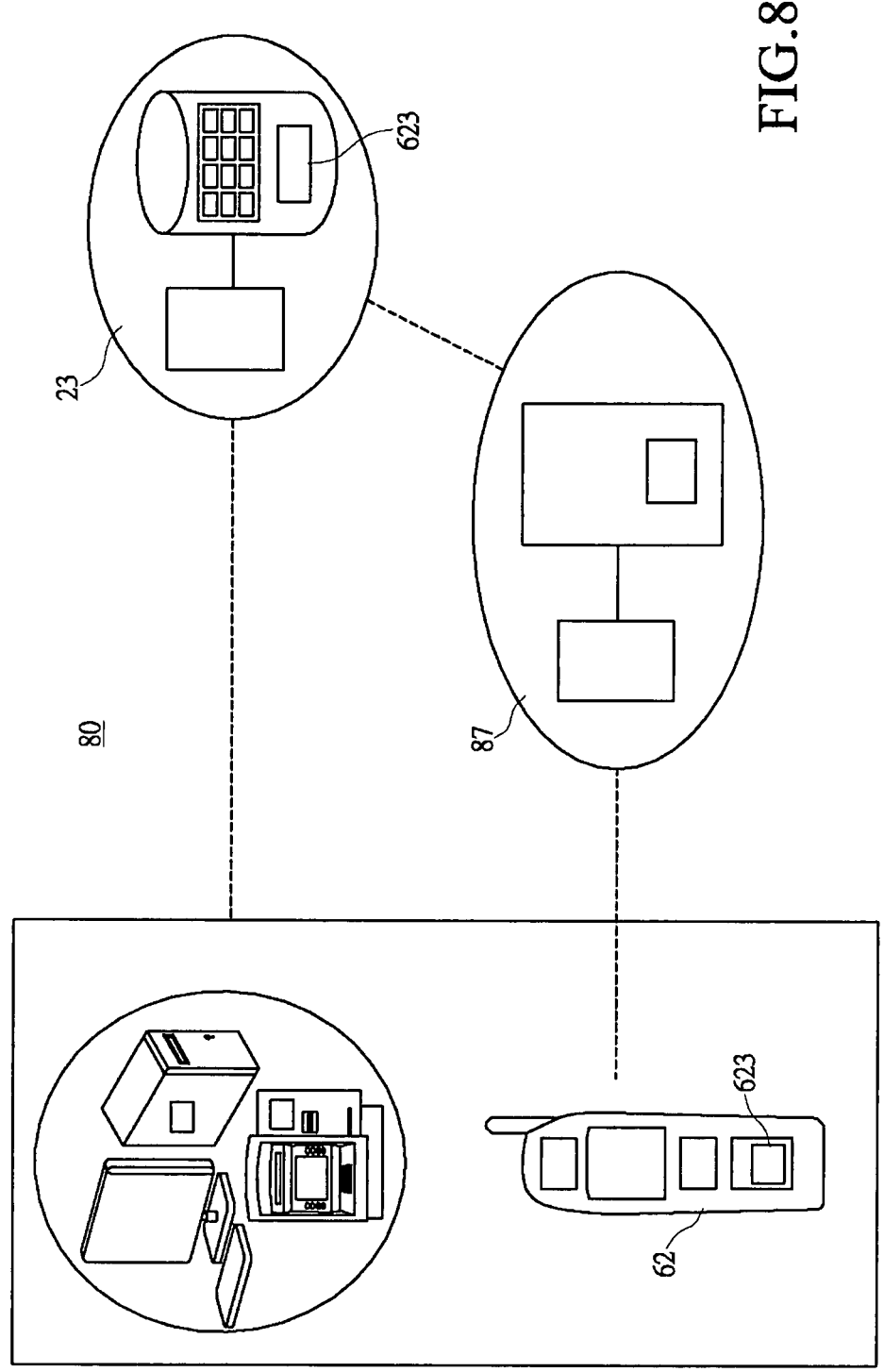
FIG. 8 is a schematic block diagram of another embodiment of the present invention an account administration system with security function.

Referring to FIG. 8 is a schematic block diagram of another embodiment of the present invention an account administration system with security function. Comparing to the embodiment of FIG. 7, the user password 623 generated by the portable communication device 62 can be sent to identification unit 23 via the monitor unit 87 in the account administration system 80, which can improve the security during the sending process of user password 623.

The foregoing description is merely one embodiment of present invention and not considered as restrictive. All equivalent variations and modifications in process, method, feature, and spirit in accordance with the appended claims may be made without in any way from the scope of the invention.

The invention claimed is:

1. An account administration method with security function, comprising the steps of:
    sending a password generation request message from a portable communication device to an issue unit to initiate a user access procedure;
    generating a user password by said issue unit, after receiving said request message;
    coding said user password using a codec of said issue unit;
    actuating said issue unit to send said coded user password to said portable communication device and an identification unit;
    decoding said coded user password received by said identification unit using a codec of said identification unit;
    decoding said coded user password received by said portable communication device using a codec of said portable communication device and displaying said user password thereon;
    manually inputting an on-line user account and said user password displayed on said portable communication device to an identification device;
    coding said input user password input to said identification device using a codec thereof; and
    initiating communication between said identification device and said identification unit to transmit said coded input user password thereto and decoding said coded input user password using said codec of said identification unit and then proceeding with an identification procedure to conclude said user access procedure.

2. An account administration method with security function, comprising the steps of:
    transmitting a request for a user password from a portable communication device to an issue unit by a user to initiate a user access procedure;
    generating a one-time-use user password by said issue unit once during a predetermined time interval responsive to said request transmitted from said portable communication device;
    actuating said issue unit to code said user password using a codec of said issue unit and to send said coded user password to said portable communication device and an identification unit;
    decoding said coded user password received by said identification unit using a codec of said identification unit;
    decoding said coded user password received by said portable communication device using a codec of said portable communication device and displaying said user password thereon;
    manually inputting an on-line user account and said user password displayed on said portable communication device to an identification device;
    coding said input user password input to said identification device using a codec thereof; and
    initiating communication between said identification device and said identification unit to transmit said coded input user password thereto and decoding said coded input user password using said codec of said identification unit and then proceeding with an identification procedure to conclude said user access procedure.

3. The account administration method of claim 2, where the step of generating a one-time-use user password by an issue unit once during a predetermined time interval includes the step of limiting a password generator of said issue unit to generating a single password one time during said predetermined time interval responsive to said request transmitted from said portable communication device of the user.

4. The account administration method of claim 2, where said predetermined time interval is 24 hours.

5. An account administration method with security function, comprising the steps of:
    generating a user password by a portable communication device to initiate a user access procedure and displaying said user password thereon;
    coding said user password using a codec of said portable communication device;
    sending said coded user password to an identification unit;
    decoding said coded user password received by said identification unit using a codec of said identification unit;
    manually inputting an on-line user account and said user password displayed on said portable communication device to an identification device;
    coding said input user password input to said identification device using a codec thereof; and
    initiating communication between said identification device and said identification unit to transmit said coded input user password thereto and decoding said coded input user password using said codec of said identification unit and then proceeding with an identification procedure to conclude said user access procedure.

6. An account administration system with security function, comprising:
    an identification unit used to initiate an identification procedure, said identification unit including a storage device for storing a plurality of user accounts, and one of said user accounts being defined as an on-line user account, said identification unit further including a first codec for decoding a user password related to said on-line user account transmitted thereto;

an issue unit connected with said identification unit via a first transmission line, said issue unit including a password generator for generating said user password related to said on-line user account after receiving a password generation request message to initiate a user access procedure and a second codec for coding said user password, said issue unit sending said coded user password to said identification unit via said first transmission line;

a portable communication device for transmitting said password generation request message to said issue unit via a second transmission line, said portable communication device receiving said coded user password from said issue unit through said second transmission line and including a third codec for decoding said coded user password to display said user password to a user; and an identification device for manual input of said user password displayed by said portable communication device and including a fourth codec for coding the user password input thereto, said identification device transmitting said coded user password from said fourth codec to said identification unit via a third transmission line to proceed with said identification procedure therein to conclude said user access procedure.

7. An account administration system with security function, comprising:

an identification unit used to perform an identification procedure, said identification unit including a storage device for storing a plurality of user accounts, and one of said user accounts being defined as an on-line user account, said identification unit further including a first codec for decoding a user password related to said on-line user account transmitted thereto;

an issue unit connected with said identification unit via a first transmission line, said issue unit including a password generator for generating a user password related to said on-line user account and usable one time, said password generator generating said user password one time during a predetermined time interval responsive to a request therefore transmitted to said issue unit to initiate a user access procedure, said issue unit further including a second codec for coding said generated user password, said issue unit sending said coded generated user password to said identification unit via said first transmission line;

a portable communication device for transmitting said password generation request message to said issue unit via a second transmission line, said portable communication device receiving said coded user password from said issue unit through said second transmission line and including a third codec for decoding said coded user password to display said user password to a user; and an identification device for manual input of said user password displayed by said portable communication device and including a fourth codec for coding the user password input thereto, said identification device transmitting said coded user password from said fourth codec to said identification unit via a third transmission line to proceed with said identification procedure therein to conclude said user access procedure.

8. The account administration system with security function of claim 7, where said predetermined time interval is 24 hours.

* * * * *